Figure 6:
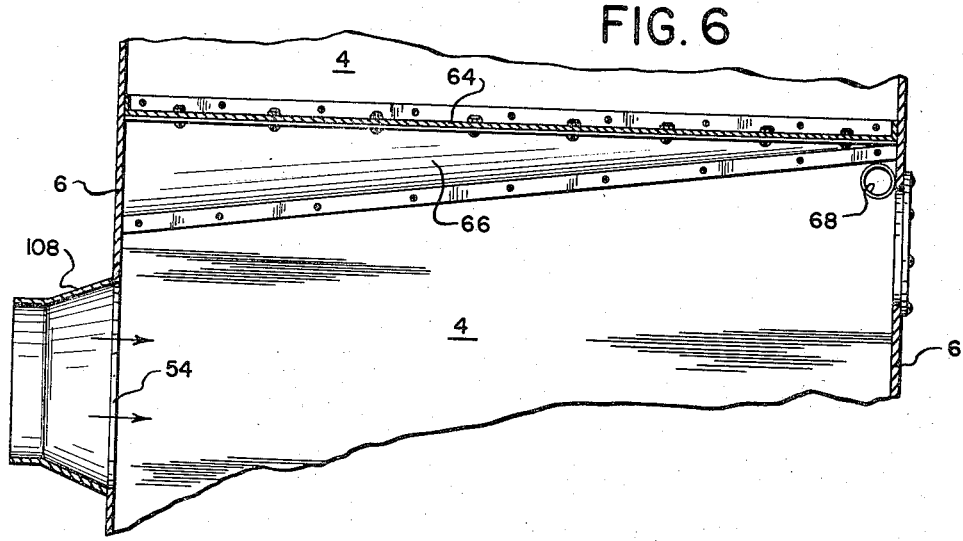

April 21, 1959
L. N. JONES ET AL
2,882,910
TOBACCO COOLER
Filed Nov. 5, 1957
7 Sheets-Sheet 1
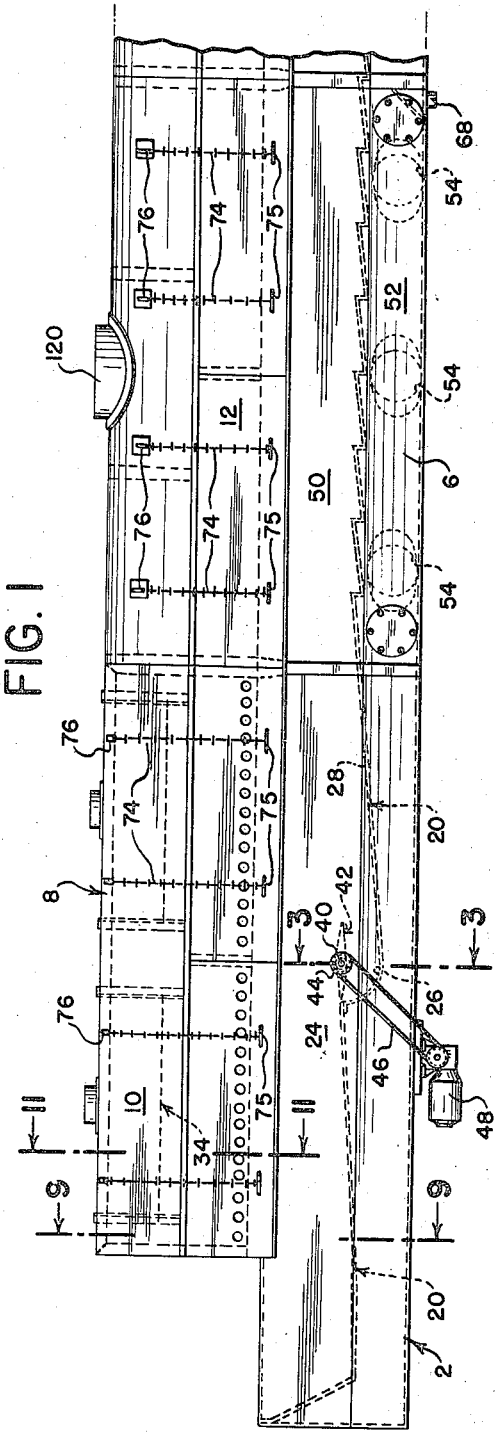
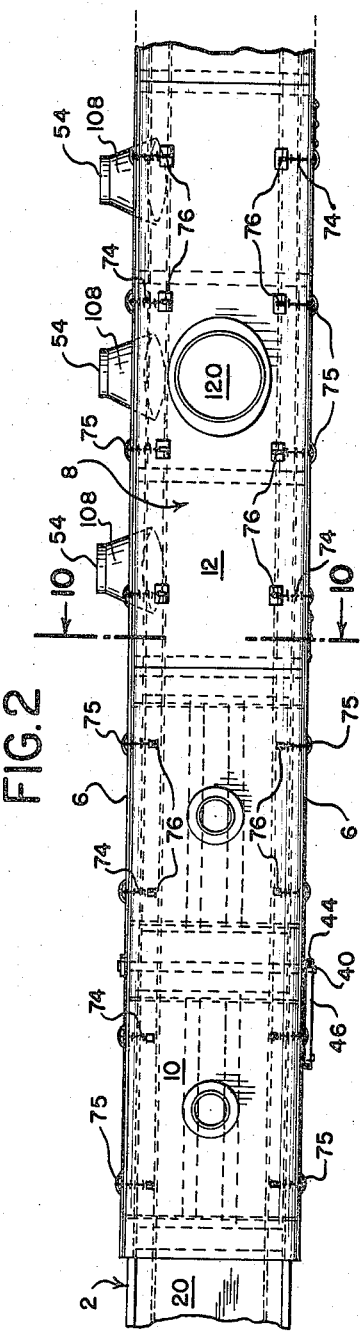
INVENTORS.
LUCIEN N. JONES
BY JAMES G. KELLY
OWEN T. MERWIN
*Pennie, Edmonds, Morton, Barrows & Taylor*
ATTORNEYS

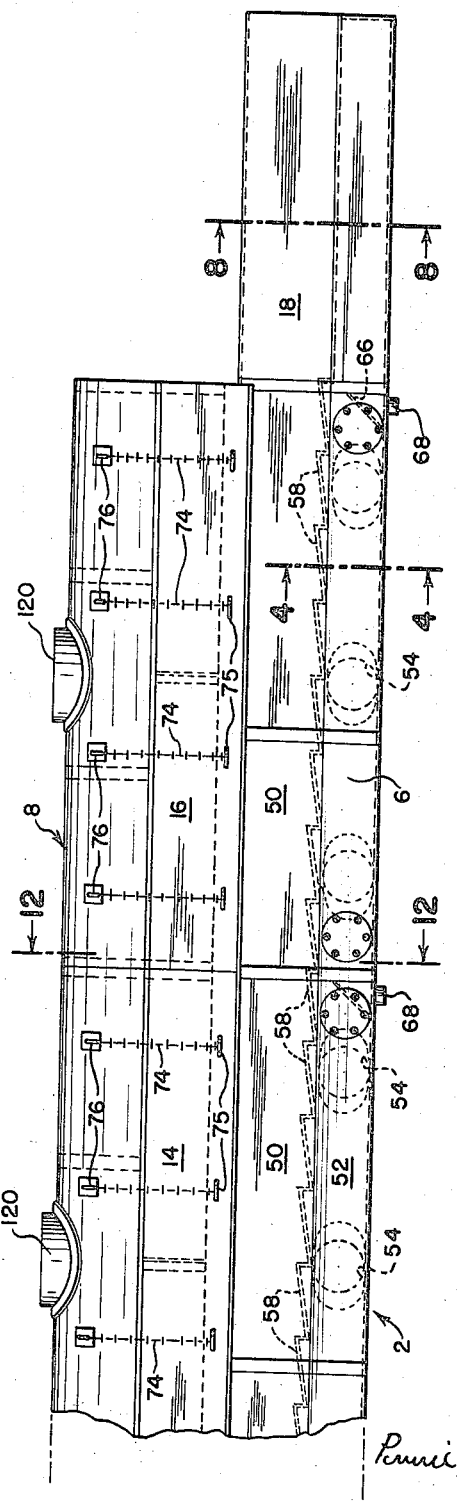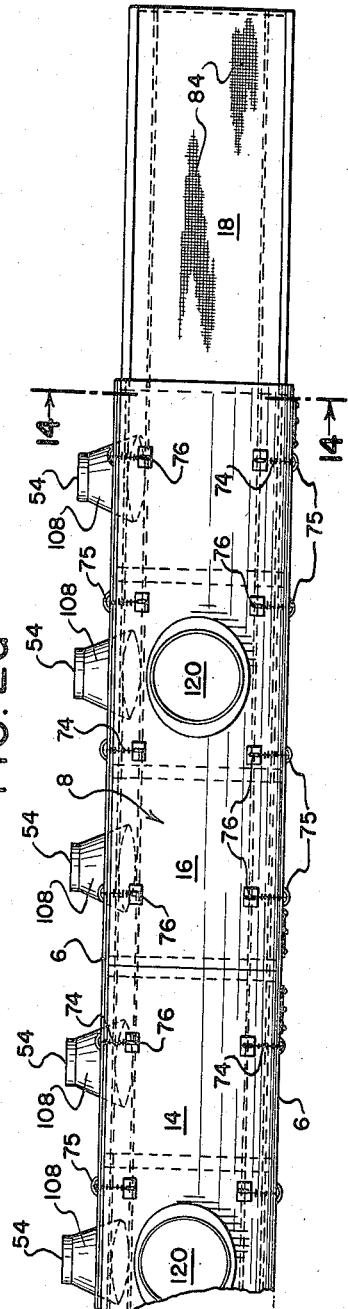
FIG.1a
FIG.2a
INVENTORS.
LUCIEN N. JONES
BY JAMES G. KELLY
OWEN T. MERWIN
ATTORNEYS

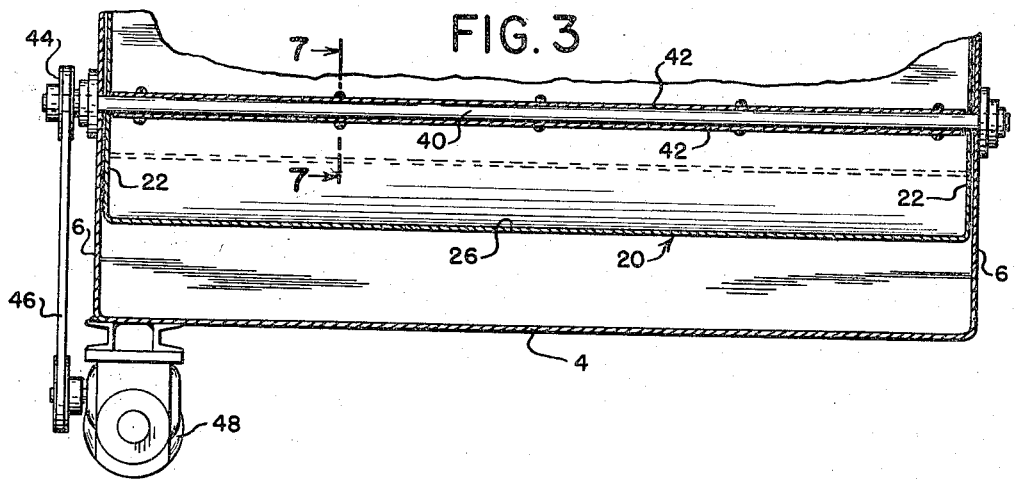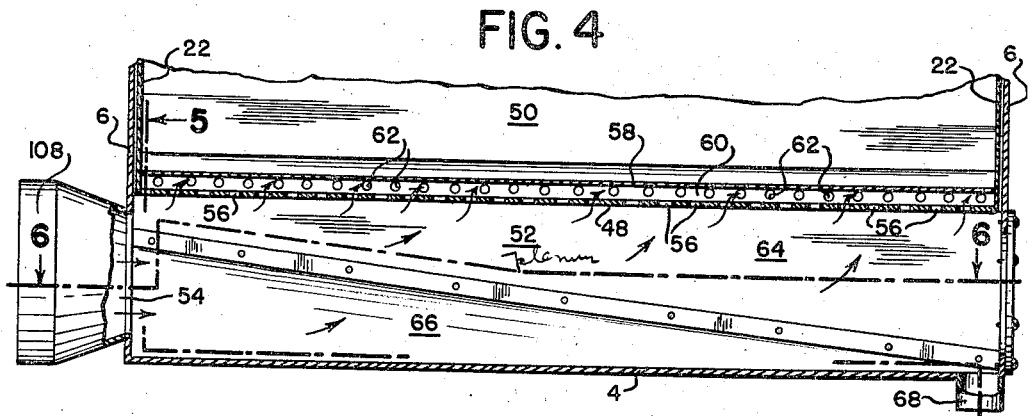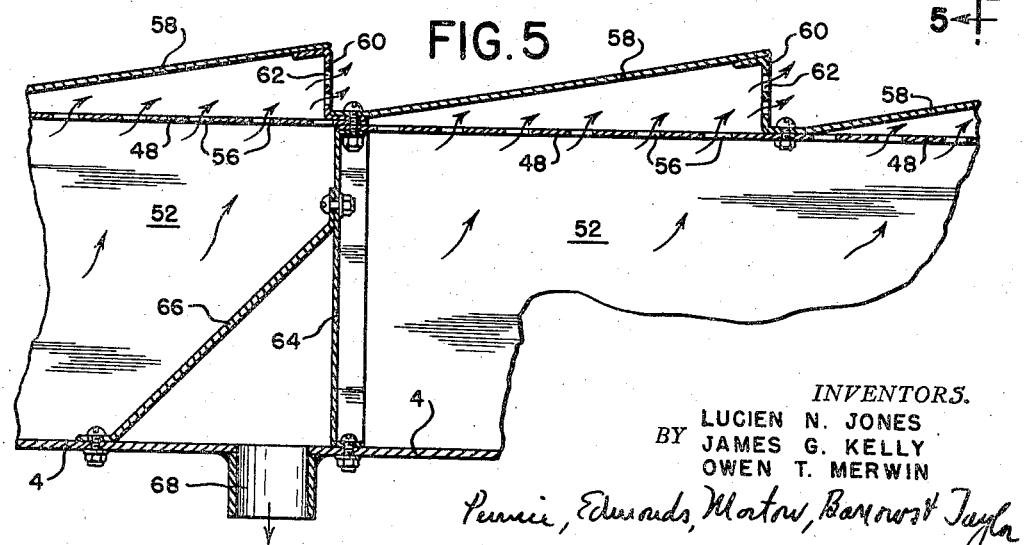

April 21, 1959 L. N. JONES ET AL 2,882,910
TOBACCO COOLER
Filed Nov. 5, 1957
7 Sheets-Sheet 4

INVENTORS.
LUCIEN N. JONES
BY JAMES G. KELLY
OWEN T. MERWIN

ATTORNEYS

April 21, 1959 L. N. JONES ET AL 2,882,910
TOBACCO COOLER
Filed Nov. 5, 1957
7 Sheets-Sheet 5

INVENTORS.
LUCIEN N. JONES
BY JAMES G. KELLY
OWEN T. MERWIN

ATTORNEYS

April 21, 1959 L. N. JONES ET AL 2,882,910
TOBACCO COOLER
Filed Nov. 5, 1957 7 Sheets-Sheet 6

INVENTORS.
LUCIEN N. JONES
BY JAMES G. KELLY
OWEN T. MERWIN

ATTORNEYS

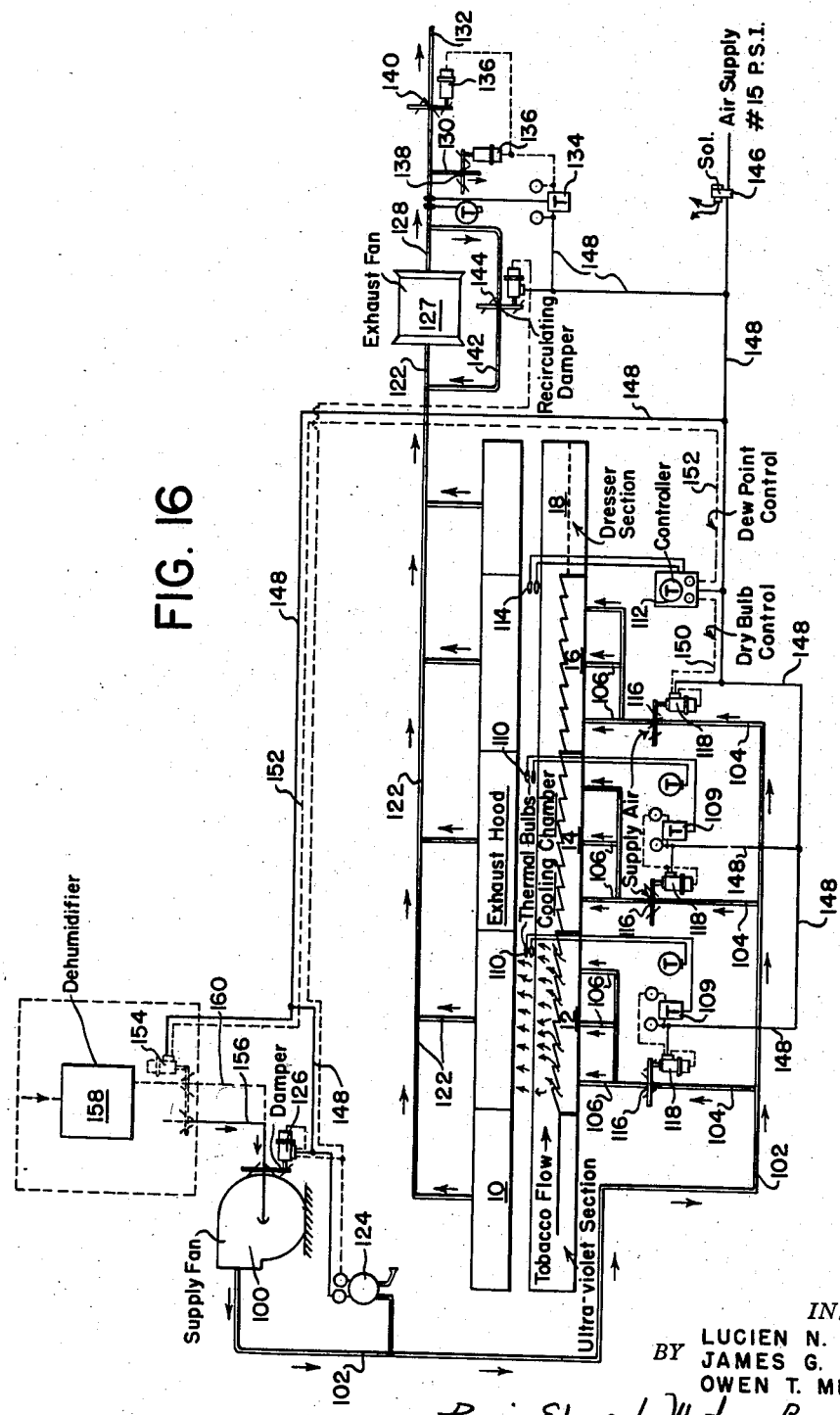

United States Patent Office 2,882,910
Patented Apr. 21, 1959

2,882,910

TOBACCO COOLER

Lucien N. Jones, James G. Kelly, and Owen T. Merwin, Richmond, Va., assignors to The American Tobacco Company, New York, N.Y., a corporation of New Jersey Application November 5, 1957, Serial No. 694,635

14 Claims. (Cl. 131—135)

This invention relates to mechanism for treatment of cut cigarette tobacco, including means for submitting the tobacco to ultra-violet radiation, means for cooling the tobacco, and means for submitting the tobacco to a final dressing, with or without regulation of its moisture content.

At the present time, cut cigarette tobacco may be irradiated with ultra-violet radiation or other similar rays. Whether or not it is so treated, it is treated to adjust moisture content and temperature and to remove fines or dust just before it is delivered to the cigarette-making machines. These various operations are performed by separate pieces of apparatus, requiring handling of the tobacco in its transfer from one machine to another. Handling of cut tobacco tends to increase the percentage of fines or dust which must be removed from the tobacco prior to its manufacture into cigarettes.

In the present invention we provide apparatus in which these various operations, or other sequences of operations of a similar character, may be performed without handling of the tobacco between each two steps or treatments. We also provide novel means for feeding the tobacco through the apparatus which contributes to the reduction of fines. This apparatus comprises a vibrating conveyor of the type in which a trough is supported for movement and provided with suitable counter-balancing means in phase opposition to the trough to balance the conveyor. Examples of such conveyors are shown in United States Letters Patent Nos. 2,630,211, granted March 3, 1953; 2,705,070, granted March 29, 1955; and 2,797,796, granted July 2, 1957. Features disclosed in the present application relating to the movement of the trough per se, form no part of the present invention and are illustrated for the purpose of a complete disclosure.

However, we have found that this final treatment of cigarette tobacco may be accomplished by addition of certain parts or structure to a vibrating conveyor trough, and that better results are obtained than are obtained from the use of separate pieces of apparatus as is the present practice. We not only reduce the production of fines by elimination of handling of the tobacco in its transfer from one apparatus to another, but the movement of the tobacco through apparatus on a vibrating trough, modified as disclosed herein, also contributes to the production of a better final product and greater yield as compared to the performance of such operations in revolving drums and other apparatus now used in the performance of such operations.

Figure 7:
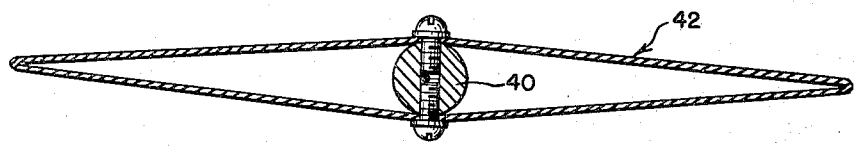
Figure 8:
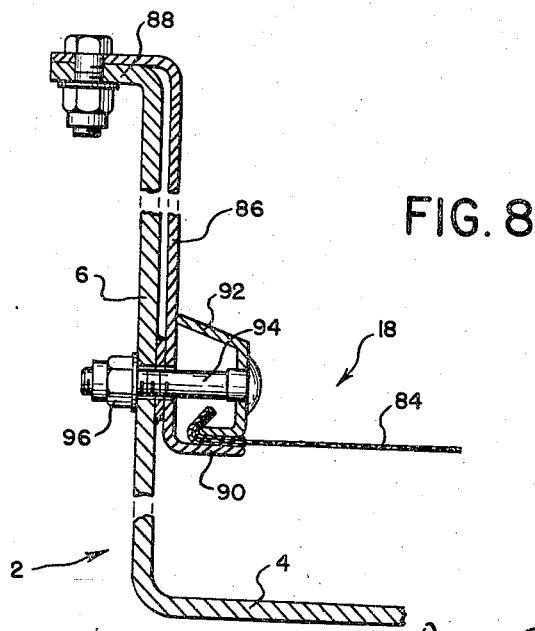
Figure 9:
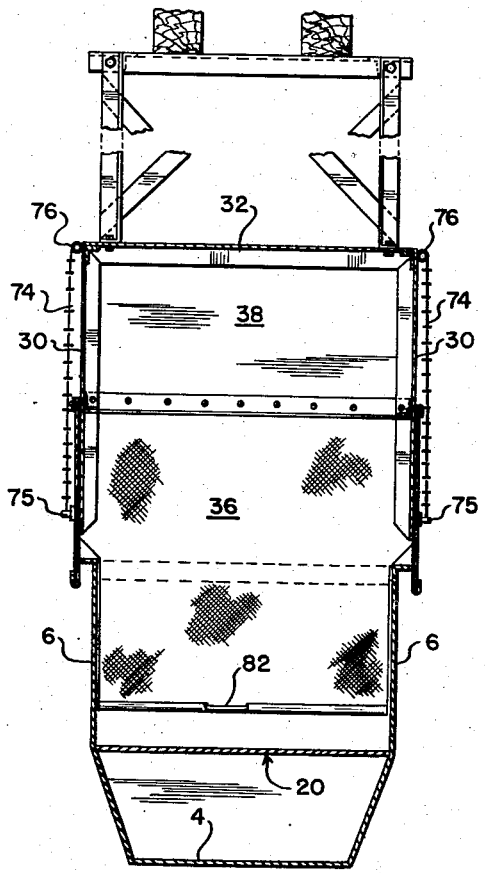
Figure 10:
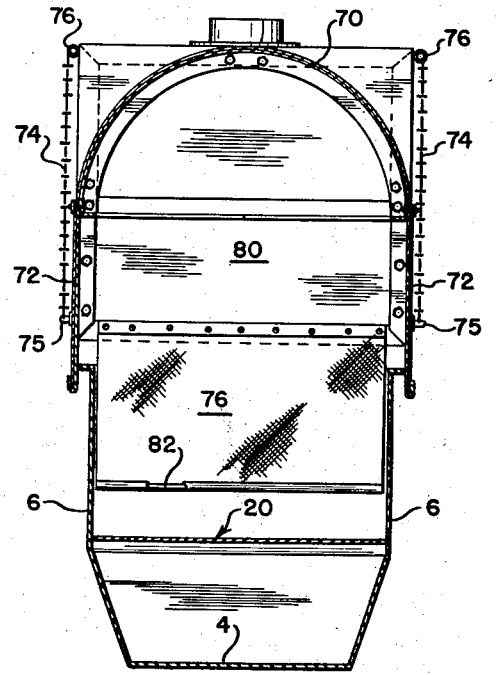
Figure 11:
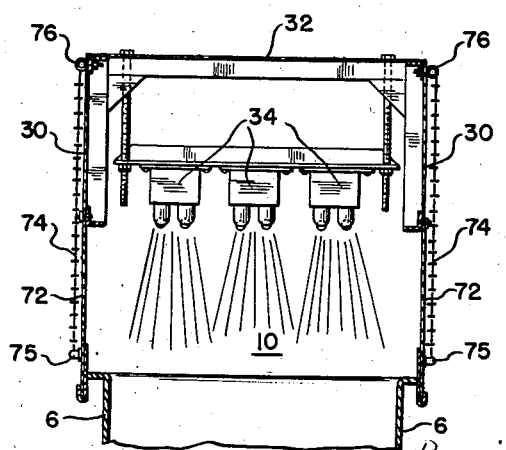
Figure 12:
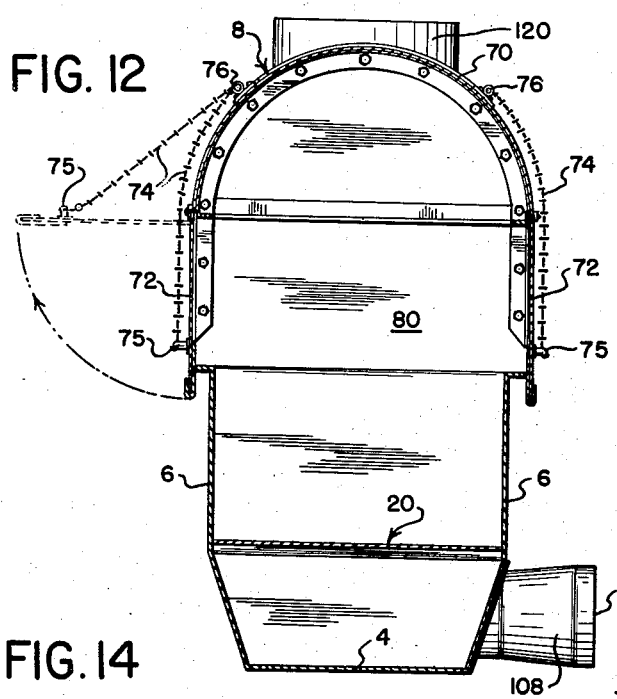
Figure 13:
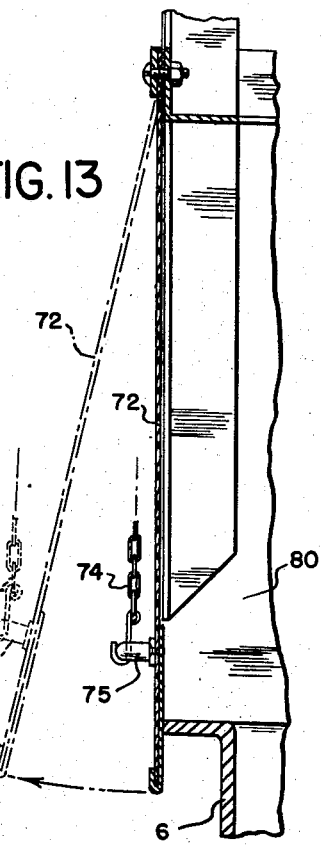
Figure 14:
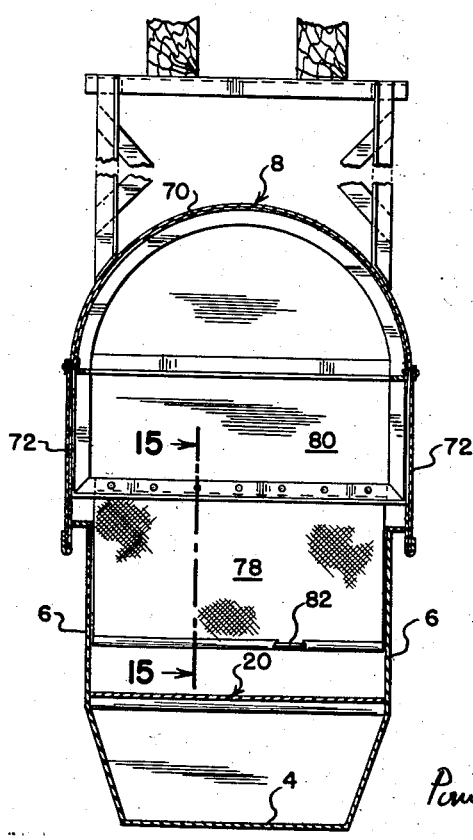
Figure 15:
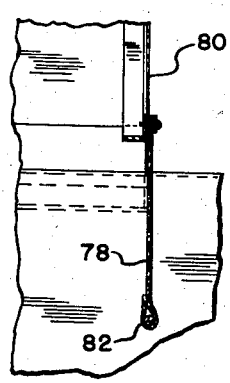

In the accompanying drawings we have shown one embodiment of the invention. In this showing:

Figs. 1 and 1a are a side elevation of the apparatus;
Figs. 2 and 2a are a plan view;
Fig. 3 is a vertical, sectional view, on line 3—3 of Fig. 1;
Fig. 4 is a similar view on line 4—4 of Fig. 1a;
Fig. 5 is a detail, sectional view on line 5—5 of Fig. 4;
Fig. 6 is a similar view on line 6—6 of Fig. 4;
Fig. 7 is a detail, sectional view on line 7—7 of Fig. 3;
Fig. 8 is a detail, sectional view on line 8—8 of Fig. 1a;
Fig. 9 is a vertical, sectional view on line 9—9 of Fig. 1;
Fig. 10 is a similar view on line 10—10 of Fig. 2;
Fig. 11 is a similar view on line 11—11 of Fig. 1;
Fig. 12 is a similar view on line 12—12 of Fig. 1a;
Fig. 13 is a detail, sectional view of a side curtain which permits access to the interior of the apparatus;
Fig. 14 is a vertical, sectional view on line 14—14 of Fig. 2a;
Fig. 15 is a detail, sectional view on line 15—15 of Fig. 14; and
Fig. 16 is a diagrammatic view of the controls of the cooling and drying sections of the apparatus.

Referring to Figs. 1 and 1a of the drawings, we provide a trough 2 which forms the base of the apparatus and extends the entire length. It is vibrated to cause material, such as cut tobacco, to move along it from the inlet at the left of Fig. 1 to the outlet at the right of Fig. 1a by means, such as is disclosed in the patents referred to above, and by any other similar means. For simplicity such means is not illustrated. The trough may be of any desired shape or form capable of supporting the additional apparatus or parts which form the present invention. As shown, in the detail views, it may include a bottom 4 and side walls 6. A hood 8 covers a portion of the apparatus extending from a point near the inlet end to a point slightly short of the outlet end. In the apparatus illustrated, the trough and hood form a chamber 10 for irradiation of the tobacco, and a series of chambers 12, 14 and 16 to which air of controlled temperature and humidity may be delivered to bring the tobacco to a desired temperature and moisture content. Beyond the last of these chambers, the trough forms a section 18 for removing fines or dust from the tobacco.

The hood also may be of any desired shape and may be formed of metal or other suitable material.

At the inlet end of the apparatus and in chamber 10, we provide a supporting surface 20 on which the tobacco travels. It is preferably a sheet of metal having side portions 22 arranged adjacent the side walls 6 of the trough and it is secured in the trough in any suitable manner. As shown, the surface slopes slightly upwardly from the inlet to an intermediate point 24, then curves downwardly as at 26, and then continues with a slight upward slope 28 to the end of chamber 8 and slightly into the first cooling chamber 12.

The portion of the hood associated with this portion of the conveyor has parallel side walls 30 and a flat top 32 (Figs. 9 and 11). A bank 34 of lamps capable of producing ultra-violet rays, or other desired radiation, is supported from the top of this section of the hood. A curtain 36 extends across the entrance to the trough. As shown in Fig. 9, a metal plate 38 closes the upper portion of the opening, and curtain 36 depends from its lower edge. The curtain is thus capable of being moved by tobacco on the supporting surface 20 and then returning to its normal position to close the lower portion of the entrance to chamber 10.

To insure exposure of all of the tobacco to the rays from the lamp 34, we provide means for opening the tobacco as it travels through chamber 10. As shown (see Figs. 3 and 7) a shaft 40 extends across the chamber substantially at the center of the arc of curved portion 26 of the supporting surface. This shaft carries a paddle 42 which raises the tobacco from the supporting surface and insures a more complete exposure. Shaft 40 may be provided with a pulley 44 on one end which extends through side wall 6 of the trough and is driven by a belt 46 passing over this pulley and a pulley on the shaft of motor 48. As shown (see Fig. 3) the motor is supported on the bottom of the trough.

As stated, we provide three chambers 12, 14 and 16 to which air of controlled temperature and humidity may be delivered to cool the tobacco, or dry the tobacco or cool and dry it. The apparatus could likewise be used, should occasion demand to heat the tobacco or add moisture to it. While we have shown three such chambers, the number is, of course, arbitrary, and could be more or less than three. The air feed and control of the three chambers is diagrammatically shown in Fig. 16, and will be described hereinafter. The mechanical construction of the three chambers is essentially the same, and a description of one is believed to be sufficient. In each of the chambers a plate 48 extends between the side walls 6 of the trough (see Fig. 4) at a distance above the bottom 4 dividing the chamber into an upper portion 50 through which the tobacco is conveyed and a plenum chamber 52 below it. Air is delivered to the plenum chamber through an inlet 54. Plate 48 is provided with openings 56 through which air flows from plenum chamber 52, to the upper portion 50 of the chamber. Above the plate 48, we provide a plurality of inclined plates 58 having vertical sections 60 at their ends (see Fig. 5). The vertical sections 60 are provided with openings 62. Air flowing through the openings 56 in plate 48 enters the space between plate 48 and an inclined section 58. As the air flows through openings 62 it comes in contact with the tobacco passing from the high end of one inclined section 58 to the low end of the next one. It thus encounters considerable resistance caused by the vertical section 60 and the tobacco through which it flows after passing through openings 62. We have found that this resistance is sufficient to assure uniform diffusion of the air through the entire section of the apparatus.

Occasionally some tobacco may pass through openings 62 and 56 in a reverse flow to the passage of the air and get into plenum chamber 52. We provide means to prevent tobacco from accumulating in the plenum chambers, and it is shown in Figs. 4 to 6. As shown, the plenum chambers are separated from each other by transverse walls 64. Adjacent each of the walls 64, we provide a baffle 66. As shown, the baffle is arranged at an angle to the horizontal bottom 4 of the trough and the vibration tends to deliver tobacco to one side, to the right as shown in Fig. 4. The baffle is also inclined to the vertical plane, as shown in Fig. 5. Any tobacco that gets into the plenum chamber is thus delivered to the corner at the forward end and at one side. An outlet 68 in the bottom 4 of the trough permits the tobacco to flow out of the plenum chamber when the conveyor trough is vibrated.

The portion of the hood over the plenum chambers may be rounded as shown at 70 (see Figs. 10 and 12). The lower portions 72 of the side walls 30 of the hood over the entire length may be formed of a heavy canvas or other flexible material to permit ready access to the interior of the apparatus. Chains 74 may be connected to studs 75 or other supports near the lower edges of the canvas sections, and the other ends of the chains may be connected to supports 76 on the top of the hood. By arranging the chain with an intermediate portion secured to either support 75 or 76 to decrease its overall length, the canvas portion 72 may be retained in a raised position, as indicated in dotted lines in Fig. 12. Draw curtains 78, similar to the curtain 36 at the inlet of the hood, are arranged between each of the sections 12, 14 and 16 and at the outlet end of section 16 (see Fig. 14). These curtains are suspended from the lower edge of a transverse wall 80 and each of them has a rod 82 in its lower edge to maintain it in a vertical position, except when it is moved by material passing through the apparatus to permit the passage of such material.

Beyond chamber 16 the section 18 is provided for removal of fines and dust from the tobacco. It is unnecessary to extend the hood over this section. As shown (see Fig. 8), wire screen 84 is supported in the trough spaced from bottom 4. Bracket member 86 is secured to flange 88 of the side wall 6 of the trough and extends downwardly on the inside of wall 6 the proper distance to position screen 84 as desired from the bottom of the trough. The lower end of this bracket member is provided with a flange 90 on which the screen rests. A clamping bar 92 engages the upper surface of the screen, and the members 86 are secured to each other to retain the screen in position by bolts 94 and nuts 96 arranged at suitable intervals with the bolts passing through openings in the wall 6 of the trough. We have found that the low frequency and high amplitude of vibrating conveyors gives superior results in the screening of cut cigarette tobacco. In devices heretofore used for this purpose, there is a tendency for some of the tobacco particles to lodge lengthwise in the openings of the screen. When that happens and other cut tobacco passes over the screen, friction will shear the lodged particles creating more unusable fines. In the present apparatus, the motion tends to open and fluff the tobacco. This cases the fines to settle to the bottom and facilitates their removal. We have thus been able to obtain more effective screening with less area than has heretofore been used in tumblers or other screening apparatus.

The apparatus and method for regulating temperature and moisture content in sections 12, 14 and 16 is diagrammatically shown in Fig. 16. As shown air from the room or building is delivered by fan 100 to a supply line 102. This supply line is provided with branches 104, the number of which corresponds to the number of sections 12, 14 and 16, and each branch 104 has a plurality of outlets 106 to deliver the air to plenum chambers 52. The outlets 106 are connected to air inlets 108 in the wall 6 of the trough (see Fig. 4). Thermostats 109 are connected to thermal elements 110 in the sections 12 and 14. They are located above the tobacco near the outlet end of the section.

A thermostat 112 is connected to thermal element 114 located in section 16. By positioning the thermal elements in the upper part of the cooling sections 12, 14 and 16, we provide for a full blanket of tobacco in each section before conditioned air is delivered to that section. Otherwise the delivery of air would tend to blow tobacco into the exhaust when starting up and in partial capacity operation. Thermostats 109 and 112 may be individually set to provide varying degrees of cooling in the different sections. Valves 116 in supply lines 104 are controlled by thermostats 109 and 112 through air motors 118. Air is exhausted from sections 12, 14 and 16 through outlets 120 (see Figs. 1a and 2a) to discharge line 122.

A static pressure regulator 124 in supply line 102 controls vortex damper 126 to regulate the supply of air to fan 100. It is so connected to open or close damper 126 as the quantity of air required by sections 12, 14 and 16 varies. An exhaust fan 127 is connected to the exhaust line 122. The outlet side of the fan is connected to a line 128 having branches 130 and 132 leading to the room and the exterior, respectively. A thermostat 134 with its control element mounted in line 128 is connected to a pair of air motors 136 which control damper 138 in branch 130 and damper 140 in branch 132, depending on the temperature of the exhaust air. A by-pass 142 having a damper 144 therein connects line 128 and line 122. It is also controlled by pressure regulator 124, and is opened as vortex damper 126 is closed. It thus produces recirculation of exhaust air through fan 127 in direct proportion to the reduction of supply air caused by closing or partial closing of damper 126. This prevents waste of conditioned air when not needed for treatment of the tobacco in sections 12, 14 and 16. Solenoid valve 146 is energized when fan 100 is operating. This permits the passage of compressed air at 15 p.s.i. to each of the required control components through the illustrated full lines identified by the reference numeral 148. The parts heretofore described constitute the control means when the apparatus is employed solely for cooling the tobacco in chambers 12, 14 and 16.

The apparatus may also be used to maintain a close control of the moisture content of the tobacco. This may be accomplished by controlling the dew point of the conditioned air delivered to sections 12, 14 and 16. Thermostate 112, which controls the selection 16 of the cooling apparatus is controlled by element 114 in the cooling chamber. The element 114 includes both a thermal device and a moisture sensing element. As shown, thermostat 112 is connected to damper 116 of the third section by compressed air line 150 shown in dotted lines, so that this damper is responsive to the thermal element only.

Compressed air line 152 connects controller 112 with damper 154. Line 152 is responsive to the moisture sensing segments of controller 112. Damper 154 permits or regulates delivery of air to vortex damper 126 and thus to the supply fan 100 either from the air in the room through pipe 156, or from a dehumidifier 158 through pipe 160. Thus, controller 112 by adjusting the amount of air from the room through pipe 156 and the amount of air at a controlled dew point from the dehumidifier permits the dew point of the air delivered to the cooling chamber to be adjusted to produce a desired moisture content in the tobacco as it leaves the apparatus.

It will be apparent from the foregoing description that the apparatus provides improved means for performing a plurality of operations on cut cigarette tobacco now performed in several pieces of apparatus. As stated, the elimination of handling of the tobacco between the different pieces of apparatus heretofore employed to perform these several operations results in an improved end product and reduces the amount of fines that must be removed from the tobacco.

While we make no claim to the vibrating conveyor, per se, and have in fact employed a vibrating conveyor made by some one else, we have found that its use, particularly in the cooling sections and the screening section, produces improved results and claims are accordingly incorporated herein directed to the combination of such apparatus with a vibrating conveyor having a low frequency and high amplitude vibration.

We claim:

1. Apparatus for treating cut tobacco comprising a vibrating conveyor trough, a hood arranged over the conveyor, a first supporting member for the tobacco mounted on the conveyor trough at the inlet end and spaced from the bottom of the conveyor trough, radiating means mounted in the hood over the supporting member, a second supporting member for tobacco beyond the radiating means and spaced from the bottom of the conveyor trough, means for delivering air to said second supporting member and passing it through the tobacco on said second supporting member, and a screen carried by the vibrating trough and spaced from the bottom of the conveyor trough adjacent the outlet end over which the tobacco passes.

2. Apparatus for treating cut cigarette tobacco comprising a vibrating conveyor trough, a hood over the trough, a horizontal dividing wall in the trough dividing it into a plenum chamber and a treating section, a supporting member above the horizontal wall, the supporting member comprising a plurality of inclined sections and vertical sections connecting the ends of the inclined sections, the horizontal dividing wall and the vertical sections of the supporting member being provided with openings to permit passage of air from the plenum chamber into the treating section, and means for delivering air to the plenum chamber.

3. Apparatus in accordance with claim 2 in which the plenum chamber is provided with transverse walls dividing it into sections, and individually controlled means is provided for delivering air to the sections of the plenum chamber.

4. Apparatus for treating cut tobacco comprising a vibrating conveyor trough, a hood arranged over the trough, a supporting member in the trough spaced from the bottom thereof, the space between the bottom of the trough and the supporting member forming a plenum chamber, the space above the supporting member forming a treating chamber, a supply line to deliver air to the plenum chamber, a valve in the supply line, control means for the valve, means in the treating chamber to actuate said control means, a fan to deliver air to the supply line, an inlet connected to the fan a valve in the inlet, and a pressure regulator connected to said inlet valve to close the said inlet valve of the fan as the valve in the supply line is closed.

5. Apparatus for treating cut tobacco comprising a supporting member over which the tobacco is conveyed, a hood above said supporting surface forming a treating chamber, means for delivering air to the treating chamber, said means comprising a supply line, a valve in the supply line, a fan connected to the supply line, an inlet pipe connected to the fan, a valve in the inlet pipe, a pressure regulator connected to the valve in the inlet pipe, a thermostat having thermal elements mounted in the treating chamber, and connections between the thermostat and the valve in the supply line to cause the pressure regulator to actuate the valve in the linet pipe of the fan as the valve in the supply line is opened or closed by the thermostat.

6. Apparatus in accordance with claim 4 including an exhaust fan connected to the treating chamber, a by-pass extending from the outlet side of the exhaust fan to the inlet side, and a valve mounted in said by-pass.

7. Apparatus in accordance with claim 6 in which the control means is adapted to regulate the opening and closing of the by-pass valve and said by-pass valve is opened to increase the recirculation as the valve in the inlet is closed to reduce the air supplied to the plenum chamber.

8. Apparatus in accordance with claim 4 in which the means in the treating chamber which actuates the control means includes a moisture sensitive element, a pipe to deliver pretreated air connected to the inlet pipe, and a valve in said pipe actuated by said control means whereby air from the atmosphere and pretreated air are delivered to the supply fan in regulated proportion.

9. Means for cooling and conditioning cut tobacco comprising a vibrating conveyor trough, a hood over the trough, a plate mounted in the trough above the bottom of the trough forming a supporting surface for the tobacco and cooperating with the side walls and bottom of the trough to form a plenum chamber beneath the plate, the plate consisting of a plurality of inclined sections and vertical sections connecting the ends of the inclined sections, the vertical sections being provided with openings to permit passage of air from the plenum chamber to the space above the supporting surface, means for delivering air to the plenum chamber, and means for exhausting air from the space between the supporting surface and the hood.

10. Apparatus for conditioning cut tobacco comprising a vibrating conveyor trough, a supporting member in the trough for the tobacco to be treated, a plenum chamber below the supporting member, and a treating chamber above the supporting member, the plenum chamber being divided into a plurality of sections, means for delivering air from each of said sections of the plenum chamber into the treating chamber, a control member in the treating chamber above each of the sections of the plenum chamber, a thermostat connected to each of the control members, a supply fan, an air supply line connecting the fan to each of the sections of the plenum chamber, and a valve for each of said sections to control the delivery of air to said section, said valves being controlled by said thermostats.

11. Apparatus for treating cut tobacco comprising a vibrating conveyor trough, a hood arranged over the conveyor trough, a supporting member for the tobacco mounted on the conveyor trough and spaced from the bottom of the conveyor trough, means for delivering air to said supporting member and passing it through tobacco on said supporting member, and a screen carried by the conveyor trough and spaced from the bottom of the trough adjacent the outlet end over which the tobacco passes to remove fines and dust from the tobacco.

12. Apparatus in accordance with claim 9 in which a horizontal plate is included beneath each of the inclined sections of the supporting plate, said horizontal plates each being provided with a plurality of openings.

13. Apparatus for treating cut tobacco comprising a vibrating conveyor trough, a hood arranged over the trough, a supporting member in the trough spaced from the bottom thereof, the space between the bottom of the trough and the supporting member forming a plenum chamber, the space above the supporting member forming a treating chamber, means to permit air to flow from the plenum chamber to the treating chamber, a supply line to deliver air to the plenum chamber, a valve in the supply line, control means for the valve, means in the treating chamber to actuate said control means, a fan to deliver air to the supply line, a discharge line connected to the treating chamber, to exhaust air from the treating chamber and an exhaust fan connected to the discharge line.

14. Apparatus in accordance with claim 3 including an outlet in the bottom of each section of the plenum chamber, and a baffle associated with the transverse wall of the plenum chamber to deliver any tobacco in the plenum chamber to the outlet.

References Cited in the file of this patent

UNITED STATES PATENTS

| | | |
|---|---|---|
| 1,330,238 | Carrier | Feb. 10, 1920 |
| 1,393,086 | Carrier | Oct. 11, 1921 |
| 1,711,574 | Miller | May 7, 1929 |
| 2,122,037 | Lissauer | June 28, 1938 |
| 2,375,487 | Newhouse | May 8, 1945 |
| 2,758,603 | Heljo | Aug. 14, 1956 |

FOREIGN PATENTS

| | | |
|---|---|---|
| 624,953 | France | Apr. 16, 1927 |